2,822,277

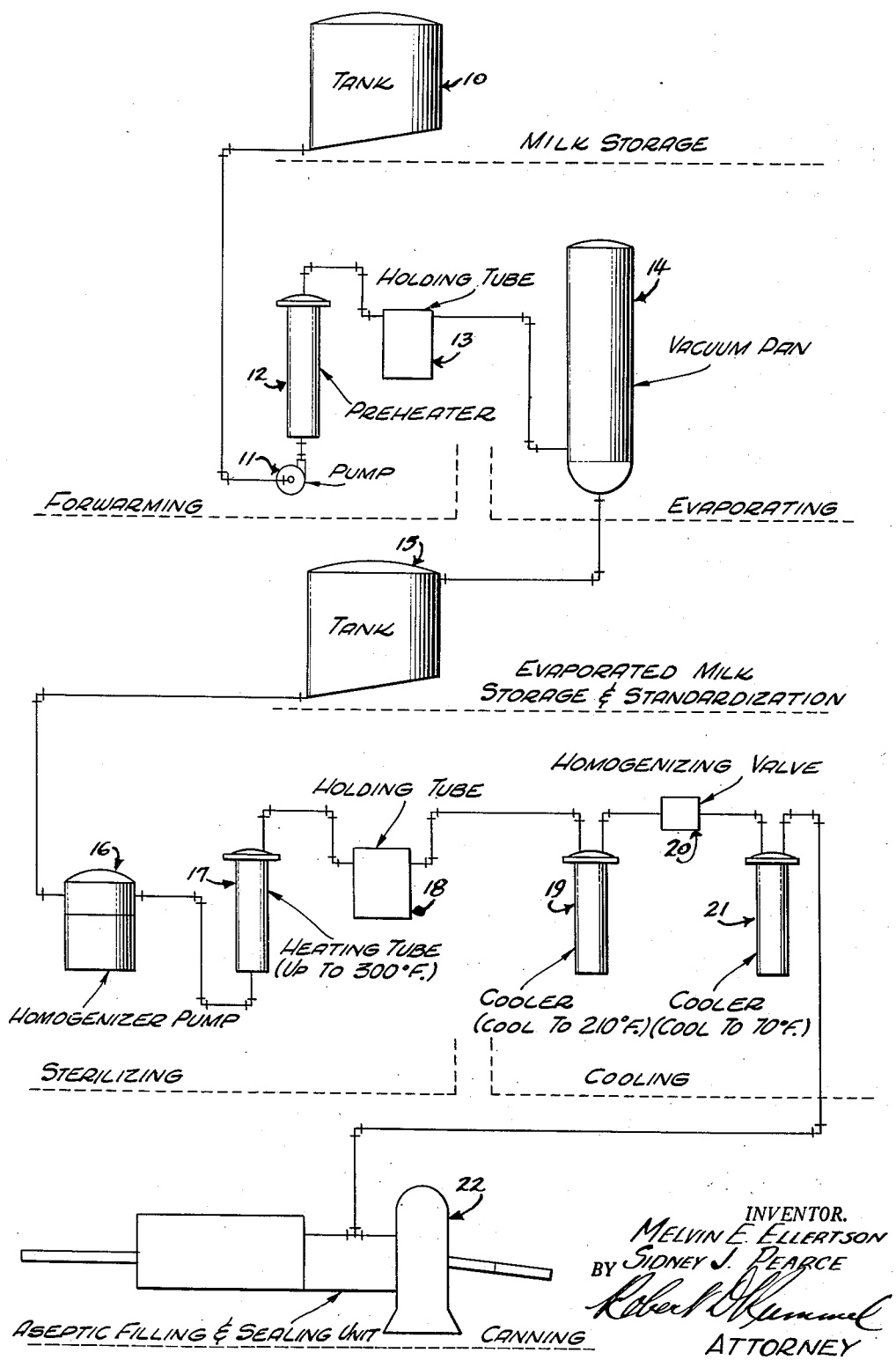

PROCESS FOR MANUFACTURING AN EVAPORATED FOOD PRODUCT AND THE PRODUCT PRODUCED THEREBY

Melvin E. Ellertson, Reseda, and Sidney J. Pearce, Granada Hills, Calif., assignors to Carnation Company, Los Angeles, Calif., a corporation of Delaware Application February 9, 1956, Serial No. 564,487

5 Claims. (Cl. 99—212)

The present invention relates to an evaporated milk product and more specifically to an improved evaporated milk and to its method of manufacture.

Evaporated milk as now produced commercially has been known for about 75 years and during this time there has been little or no change in the product or the process for making the product except perhaps improvements in the apparatus utilized for effecting the process. The product that is known today is substantially the same as the product of 75 years ago. It is the considered opinion of many people that evaporated milk as we know it today has a number of undesirable characteristics which render it non-competitive with fresh milk or pasteurized milk in many instances. It is a highly caramelized product which renders an undesirable flavor variously described as "cooked" or scorched." It also has a relatively high viscosity which for certain purposes is highly undesirable.

To more fully appreciate and understand the principles of applicants' invention, it will be necessary to review the process for making conventional evaporated milk. In general, this process entails 5 essential steps which in the order of performance are:

(1) Forewarming
(2) Concentrating
(3) Homogenizing
(4) Filling into containers
(5) Retorting or sterilizing The first step, forewarming, consists of heating the raw fluid milk to a temperature of between 180° and 212° F. and for a holding period of from 20 to 7 minutes. This step pasteurizes the milk and gives stability to the milk against later excessive coagulation in the sterilization operation. After the forewarming step, the milk is directed into a vacuum pan and concentrated at a temperature of about 140° F. In the case of evaporated whole milk the concentrated product at this point contains not less than 7.9% of milk fat and not less than 25.9% of total milk solids. After the fluid milk has been concentrated in the vacuum pan, the concentrated milk is directed through a homogenizer wherein it is homogenized at pressures of about 2,000 p. s. i. The homogenization step is necessary to break up the fat globules to very small particles so that the butterfat will not separate upon subsequent storage of the finished product. The concentrated homogenized milk is then filled into cans or containers and the cans are retorted or sterilized at temperatures of 240° to 250° F. for from 18 to 10 minutes. This prolonged heat treatment at this high temperature is necessary to insure sterility of the finished product; however, at the same time it has the undesirable effect of coagulating or altering the protein of the milk to such an extent that the final product is characterized by the cooked or caramelized flavor above referred to. The caramelized flavor, as it is well known in the art, is due to the reaction between the lactose and the protein in the milk, whereas the cooked flavor is due to the reaction of the milk to excessive heat.

Inasmuch as the undesirable characteristics of evaporated milk as we know it today are primarily imparted to the product in the sterilization step, it is an object of the present invention to modify this sterilization treatment in such a way that the sterilized evaporated milk produced by this improved process is whiter in color, has a fresh milk flavor, is not highly viscous, and is highly stable against gelation without any tendency toward fat separation.

It is also an object of the present invention to manufacture an evaporated milk which is not characterized by the "cooked" or "caramelized" flavor of conventional evaporated milk.

A further object of the present invention is to provide a process for sterilization of the concentrated milk in which it is possible to completely sterilize the milk in bulk while at the same time stabilize the same against gelation.

It is well known in the art that the destruction of bacteria in the sterilization step is a function of time and temperature. The higher the temperature, the shorter the time required for sterility. For example, temperatures of 240° F. for 15 minutes, 250° F. for 5 minutes, or 262° F. for 1 minute, are approximately equivalent. This time-temperature relationship assumes instantaneous heating and cooling; however, in the retorting of conventional canned evaporated milk such instantaneous heating and cooling is not possible, inasmuch as the heat must penetrate the can which takes considerable time. Considerable time, therefore, is required to bring the can to the required retort temperature and to cool it down again. If, for instance, it is desired to raise the temperature of the milk in the can to a temperature in the range of from 260° to 275° F., it is necessary to bring the cans or containers of milk into contact with a medium having a temperature between 280° and 300° F., which is well above the highest temperature reached in the center of the container. As pointed out above, the more rapidly the temperature is raised in the critical sterilizing step and the faster the cooling, the less the flavor of the milk is changed. In order to accomplish this time-temperature sterilization step as expeditiously as possible when sterilizing milk in the cans, the cans are usually agitated vigorously in such a manner as to allow maximum heat transfer to take place. As a practical matter, however, to insure sterility of the product, overheating usually takes place and as a result the final product is characterized by its cooked and caramelized flavor. While many improvements have been made in apparatus for agitating the cans or containers of milk in such a manner as to most expeditiously allow for the transfer of heat through the product inside the cans, the problem of overheating to positively insure sterility has never been completely solved to an extent that a light colored, fresh-milk flavored, not highly viscous evaporated milk is produced.

The present invention contemplates processing the concentrated milk in bulk in such a manner that the product is not only sterilized with respect to bacteria but also is stabilized with respect to storage gelation and then packaging under sterile conditions in sterile cans.

The invention further contemplates the sterilization and stabilization of concentrated milk in bulk and then the homogenization of this sterile milk so as to insure against later fat separation when the finished product is packaged in sterile cans under sterile conditions.

The present invention also contemplates in general an improved evaporated milk and an improved method for its manufacture.

In accordance with the present invention, the improved evaporated milk is prepared by a closely related series of steps which include in general:

(1) Forewarming
(2) Concentrating
(3) Sterilizing
(4) Homogenizing
(5) Filling into sterile containers under sterile conditions.

The forewarming step is a high-short method which imparts less change in flavor to the milk than the conventional forewarming method. In this high-short method, the milk is heated to temperatures of 265° to 290° F. for thirty seconds to one minute, whereas in the conventional forewarming method the milk is heated to a temperature of 180° to 212° F. for a holding period of from 20 to 7 minutes. Since forewarming by this high-short method is carried out at a higher temperature for a very short time as compared with the conventional forewarming method, relatively little caramelization or protein coagulation takes place and consequently the milk at this stage is but very slightly altered with respect to flavor, viscosity, and color.

The concentration of the milk is accomplished in a vacuum pan in the same manner as for conventional evaporated milk and the concentrated product at this point contains not less than 7.9% of butterfat and not less than 25.9% total milk solids.

The sterilization step is the crux of applicants' invention and permits an evaporated milk product to be manufactured which does not have an objectionable cooked or caramelized flavor while at the same time being light in color, not highly viscous and stable with respect to gelation while in storage. It has been shown that caramelization (the reaction between lactose and protein) and coagulation of protein are time-temperature dependent. The temperature coefficients for the rates of these two reactions, however, are lower than that for the thermal destruction of bacteria. It would, therefore, be expected that if sterilization were carried out at a higher temperature for a very short time that relatively little caramelization or protein coagulation would take place and such a process would be expected to yield a product which was but slightly altered in flavor from that of fresh whole milk. It has also been found that while a temperature of, for instance, 285° for five seconds will yield a sterile product of excellent flavor, such a product will almost certainly gel within a short time after it has been manufactured. To prevent such gelation, we have found that a certain minimum heating time is required and that this minimum heating time is about 70 seconds. It will be appreciated, however, that this minimum heating time is dependent upon the type of milk being processed, the time or season of the year when this milk is produced and the geographical region or area in which the milk is produced and is being processed, and that this minimum heating time is therefore variable. The time of 70 seconds, however, has been found to generally apply to all types of milk regardless of where or when produced or processed. Subjecting the concentrated milk to a temperature of 264° to 285° F., for 70 seconds produces a product which, besides being sterile and which flavorwise compares very closely with fresh whole milk, is stable against storage gelation. It has also been found that if the temperature of sterilization is suitably lowered to approximately 260° F., the time of sterilization can be extended up to approximately 210 seconds without appreciably altering the flavor of the finished product. In each of the above instances, the product has been found to be stable against gelation for storage periods of four months at 100° F.

High-temperature short-time sterilized evaporated milk has relatively little viscosity. Therefore, in order to prevent fat separation or the settling out of the butterfat, it is necessary to homogenize the evaporated milk to a degree such that the average diameter of the fat globules will fall between ½ and 1 micron. It is believed these small fat globules must be stabilized with a protective layer of protein so as to insure against later fat separation. The sterilized milk is preferably homogenized at a temperature of 210° F. after sterilization at which temperature the optimum protein layer will be formed upon the fat globules. To effect this operation, the milk as it leaves the sterilizing process is preferably cooled in a tubular heat exchanger or by flashing in a low pressure chamber until it reaches a temperature of 205° to 210° F., then homogenized, and then immediately cooled to 60° to 70° F.

At this point the product is finished as far as further processing is concerned and can be filled in any suitable manner into sterile cans under sterile conditions.

The principles of the present invention can also be effected by the following series of steps:

(1) Forewarming
(2) Concentrating
(3) Homogenizing
(4) Sterilization
(5) Filling into sterile containers under sterile conditions It will be noted in this series of steps that the concentrated milk is homogenized before sterilization. While we have found that homogenization before sterilization is rather inefficient and that it is difficult to achieve a fat globule with a diameter of ½ to 1 micron and that the fat globules tend to cluster and form aggregates with protein during heating, the final product is substantially the same as the preferred method.

The product of the present invention can also be achieved if homogenization occurs at sterilization temperatures; however, difficulty is occasionally encountered in regard to clumping and sludging out of fat and protein in the product and it is believed that possibly the protein is destabilized. It will be appreciated, however, that the improved product of the present invention can be obtained.

For a better understanding of the principles of the present invention, reference can be had to the accompanying drawing which is a diagrammatic showing of a typical form of apparatus for preparing an evaporated milk in accordance with the present invention.

As shown in the drawing, a typical form of apparatus for preparing an evaporated milk in accordance with the principles of the present invention may consist of a storage tank 10 from which milk is delivered by a pump at 11 into a preheater 12. The preheater is so constructed and the flow of milk through the preheater is so regulated that the temperature of the milk as it leaves the preheater is in the neighborhood of 265° to 290° F. The milk is directed from the preheater into a holding tube 13 where it is held at this temperature in the range of 265° to 290° F. for some 30 seconds up to one minute. It will be appreciated that this forewarming process is what has previously been referred to as the high-short method.

As previously suggested, the forewarming treatment is important for controlling the coagulation that will develop in the evaporated milk by the sterilizing process and at the same time effects pasteurization of the milk.

At the end of the holding time the milk is withdrawn from the holding tube 13 and directed into a vacuum pan 14 while a vacuum is maintained in the latter and wherein the milk is evaporated. The vacuum pan can be of any suitable or well-known construction and the vacuum is maintained in the pan by means of a suitable vacuum pump thereby evaporating the fluid from the milk and removing the oxygen therefrom. A suitable condenser is usually associated with a vacuum pan of this type for condensing the vapors removed from the pan.

The concentrated milk is withdrawn from the vacuum pan and directed into a holding tank 15 from which the milk is delivered by a homogenizer pump 16 into a suitable heating tube 17. The function of the holding tank 15 is to allow standardization of the milk and/or to equalize the flow of the concentrated milk into the homogenizer pump 16. The milk is directed through the heating tube 17 and into a holding tube 18 and the heating tube 17 and the holding tube 18 constitute apparatus for effecting the sterilizing treatment of the evaporated milk. The heating tube is so constructed that the milk during its travel through the tube is heated to a temperature of beween 264° and 285° F., and is held in the holding tube 18 for a minimum sterilizing time of approximately 70 seconds. As previously suggested, the minimum sterilizing time to effect sterilization as well as stability against later gelation is about 70 seconds.

After the sterilizing treatment, the milk is directed into a cooler 19 wherein it is preferably cooled to a temperature of approximately 210° F., and from there into a homogenizing valve 20. While the drawing discloses a homogenizer pump as being positioned before the sterilizing treatment, it will be understood that the homogenizer pump can be positioned after the sterilizing treatment apparatus. It will be appreciated, however, that there are certain advantages in positioning the pump in its disclosed position because, firstly, some sort of pumping apparatus is needed for forcing the milk through the heating tube and into the holding tube and, secondly, since the milk is sterilized after having passed through the homogenizer pump contamination of the sterilized milk is less likely to occur than if the sterilized milk had to be directed through a homogenizer pump.

The homogenizer valve as previously suggested is preferably of the type that will break up the milk fat globules into diameters of approximately ½ to 1 micron and the cooler is so designed as to cool the milk to approximately 210° before the same is passed through the homogenizer valve, it having been found that at this temperature the optimum protein layer is formed upon the fat globules.

After homogenization, the evaporated milk is directed into a cooler 21 wherein it is immediately cooled to a temperature from 60° to 70° F. after which it is directed into an aseptic filling and sealing unit 22 wherein it is packaged under sterile conditions in sterile cans under low oxygen atmosphere.

The conventional method of manufacturing evaporated milk entails the filling and sealing of a non-sterile concentrated milk product into a non-sterile container with sterilization taking place in the sealed container. This results as previously suggested in an evaporated milk product which is characterized by a cooked and/or caramelized flavor. In applicants' process sterilization is effected of the bulk evaporated milk and the sterilized bulk evaporated milk is filled under sterile conditions into sterile cans. The type of can used, whether of the compound type or the conventional venthole type, or the apparatus for filling these cans under sterile conditions, or the apparatus for sterilizing the cans, are not a feature of the present invention and can be of any suitable or well-known type which would be applicable to the instant product.

A specific embodiment of a process for manufacturing the improved evaporated milk of the present invention and utilizing apparatus of the type diagrammatically shown in the drawing could be as follows:

(a) The milk is forewarmed at 269° F. for 35 seconds.

(b) This forewarmed milk is then concentrated to 26% total solids.

(c) The concentrated milk is then sterilized and stabilized against storage gelation at 264° F. for 70 seconds.

(d) The sterilized concentrated milk is then cooled to 210° F. and homogenized at 4,000 p. s. i.

(e) The bulk sterilized evaporated milk is then filled into sterile containers under sterile conditions in, for instance, a Martin Aseptic Canning Unit.

Substantially similar results can be obtained by the following series of operations.

(a) The milk is forewarmed at 269° F. for 30 seconds.

(b) This forewarmed milk is then concentrated to 26% total solids.

(c) The concentrated milk is then sterilized and stabilized against storage gelation at 266° F. for 70 seconds.

(d) The sterilized concentrated milk is then immediately homogenized at the sterilizing temperature, 266° F. and 4,000 p. s. i.

(e) The bulk sterilized evaporated milk is then cooled to 60° F. and filled into sterile containers under sterile conditions in, for instance, a Martin Aseptic Canning Unit.

It will be appreciated that the product of the present invention is characterized by the fact that it is not highly viscous, it has a fresh milk flavor, and that it is substantially lighter in color than conventional evaporated milk. The process of the present invention is also characterized by the fact that bulk sterilization and stabilization against storage gelation is effected and that this sterilized and stabilized evaporated milk is filled into sterile containers under sterile conditions. From the foregoing description of a typical process embodying the invention and the resulting product, it will be apparent that an evaporated milk product made in accordance with the principles of the described process has novel and highly desirable characteristics.

It will be understood, of course, that the process described above may be varied and that widely varying apparatus may be used for practicing the process without departing from the spirit of the invention. It will also be appreciated that other type evaporated milk products, such for example as an evaporated skim milk and an evaporated partially skim milk, can be manufactured utilizing the principles of the present invention. Accordingly, it should be understood that the above described process should be considered as illustrative only and not as limiting the scope of the following claims.

What is claimed is:

1. A short-time high-temperature process for sterilizing evaporated milk and for stabilizing the same against storage gelation comprising the steps of subjecting the milk to a heated medium of a temperature sufficient to raise the temperature of the milk to approximately 264° to 285° F. and holding for approximately 70 seconds, cooling said treated milk to approximately 210° F., then homogenizing the treated milk and then reducing the temperature immediately to approximately 70° F.

2. A short-time high-temperature process for sterilizing evaporated milk and for stabilizing the same against gelation comprising the steps of subjecting the milk to a heated medium of a temperature sufficient to raise the temperature of the milk to approximately 264° to 285° F. and holding for approximately 70 seconds, then homogenizing the treated milk and then reducing the temperature immediately to approximately 70° F.

3. An evaporated milk product made in accordance with the method of claim 2.

4. In a short-time high-temperature process for sterilizing concentrated milk and for stabilizing the same against storage gelation, the steps of subjecting the concentrated milk to a heated medium of a temperature sufficient to raise the temperature of the concentrated milk to approximately 264° to 285° F. and holding the milk in this temperature range for approximately 70 seconds and then reducing the temperature immediately to approximately 70° F.

5. In a short-time high-temperature process for sterilizing concentrated milk and for stabilizing the same against storage gelation, the steps of subjecting the concentrated milk to a heated medium of a temperature sufficient to raise the temperature of the concentrated milk to approximately 270° F. and holding the milk at this temperature for approximately 70 seconds and then reducing the temperature immediately to approximately 70° F.

References Cited in the file of this patent

UNITED STATES PATENTS

| | | |
|---|---|---|
| 2,372,239 | Whitaker et al. | Mar. 27, 1945 |
| 2,490,599 | Otting | Dec. 6, 1949 |

OTHER REFERENCES

Journal of Dairy Science, vol. 26, No. 7, July 1943, pp. 582–583.